2,757,292

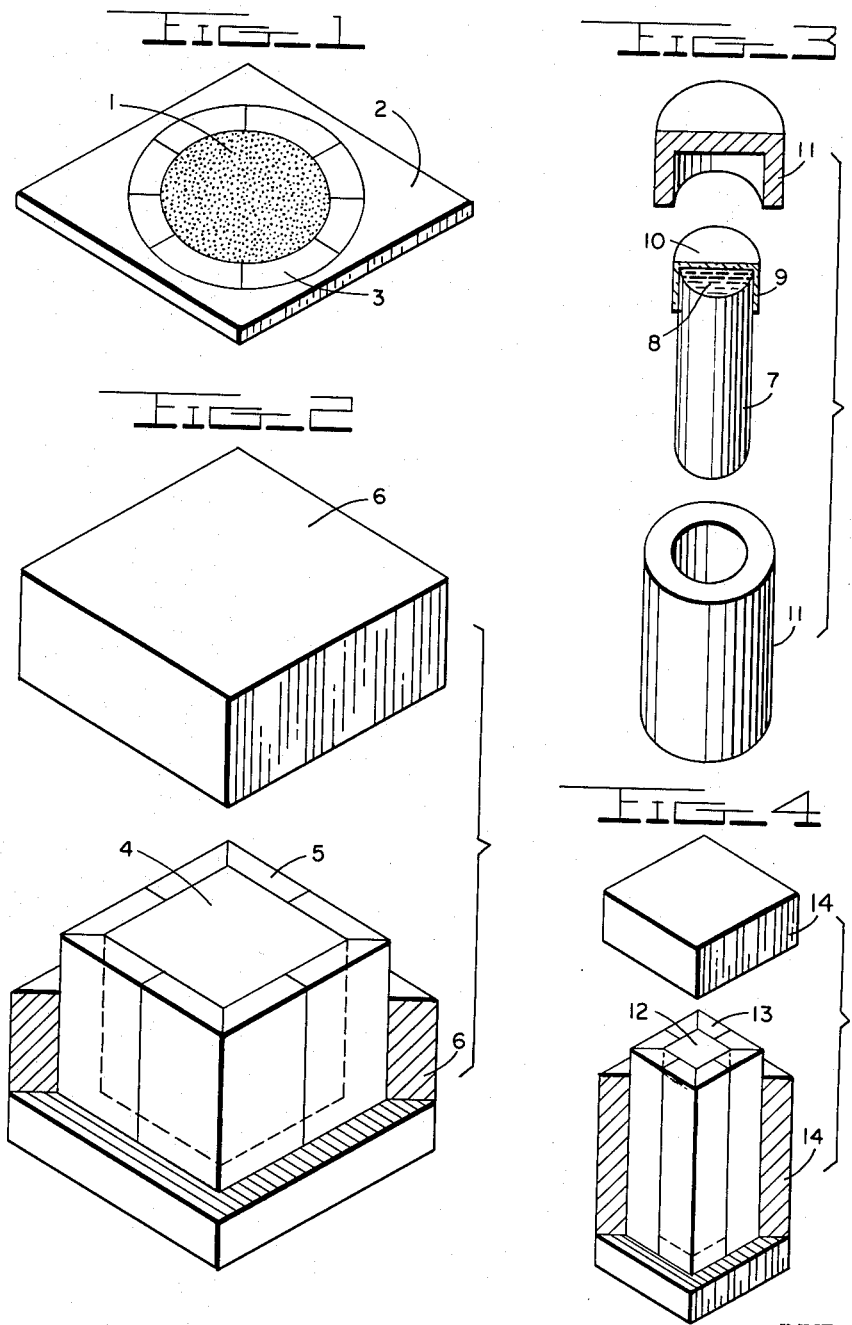
INVENTORS
JAMES H. SCHULMAN
ROBERT J. GINTHER

RADIATION SENSITIVE ALKALINE EARTH FLUORIDES AND DOSIMETERS EMPLOYING SAME

James H. Schulman and Robert J. Ginther, Washington, D. C., assignors to the United States of America as represented by the Secretary of the Navy Application April 29, 1953, Serial No. 352,069

(Granted under Title 35, U. S. Code (1952), sec. 266)

12 Claims. (Cl. 250—83)

This invention relates to a new class of materials which are sensitive to ionizing radiation, more particularly to X-rays and gamma rays. It also relates to new radiation dosimeters employing the new radiation sensitive material.

It is an evident matter that the treatment of individuals or the disposition of objects which have been exposed to X-rays or gamma rays can be expedited and in general more efficaciously carried out with the aid of some means which would provide a record of the intensity of the received radiation which is susceptible of evaluation in terms of unit dosages.

The present invention has an object therefore the provision of means of the aforesaid kind which on exposure to X-rays or gamma rays is capable of developing a visible signal therein, the strength of which is indicative of the intensity of the absorbed radiation and can be evaluated in terms of unit dosages. It is a further object to provide means of this kind which can be made in a small size so as to be carried about on the person. Other objects will become apparent as the description of the invention proceeds.

The invention will be described with reference to the accompanying drawing in which are shown several forms of a dosimeter by which the new radiation sensitive material may be applied for the detection and recording of the intensity of X-rays and gamma rays and in which:

Figure 1 shows one type of dosimeter in which the radiation sensitive material in powder form is affixed to a flat support.

Figure 2 shows a modified form of dosimeter in which the radiation sensitive material in fine particle form is embedded in a solid transparent medium of matching refractive index, and a protective case therefor in exploded view, and, Figure 3 shows a further modified form of dosimeter in which the radiation sensitive element is a suspension of fine particles of the radiation sensitive material in a transparent liquid of matching refractive index filling a sealed flat-bottomed tube of transparent material provided with a window at its top end through which visual determination of the depth of the developed color may be made, and a protective case therefor in exploded view.

Figure 4 shows another type of dosimeter in which a single crystal of the radiation sensitive material is used, and a protective case therefor in exploded view.

We have found in accordance with our invention that radiation sensitive materials which on exposure to X-rays or gamma rays are capable of undergoing development of color therein, the presence of which is indicative of exposure to said rays and the depth of which can be availed of to measure the dosage or intensity of the absorbed radiation, can be obtained by diffusing a small proportion of an alkali metal fluoride into the crystal lattice of alkaline earth fluorides. The alkali metal fluoride acts to sensitive the alkaline earth fluoride so as to cause it to develop a visible color on exposure to X-rays and gamma rays. The depth of the color developed is a measure of the intensity of the absorbed radiation.

Alkaline earth fluorides in which the alkali metal fluoride is not present in the crystal lattice but only in simple admixture do not have the property of developing color on exposure to X-rays and gamma rays. In addition to their visible color inducing effect, the alkali metal fluorides also enhance the absorption of the alkaline earth fluorides in the ultra violet region and to an extent such that the effect can be applied by known procedure, in the alternative, to the unit dosage measurement of the intensity of the absorbed radiation.

The alkaline earth fluorides may be, for example, calcium fluoride, barium fluoride, etc., and the alkali metal fluorides may be, for example, sodium fluoride, potassium fluoride, etc. A preferred host salt for the radiation sensitive materials is calcium fluoride and preferred sensitizing salts are sodium fluoride and potassium fluoride. Irradiation of the radiation sensitive materials with X-rays and gamma rays will develop a color in accordance with the particular host salt and the particular sensitizing salt in the crystal lattice. For example, calcium fluoride with either sodium, potassium or lithium fluoride in the crystal lattice will exhibit a blue color on irradiation with X-rays or gamma rays and with caesium fluoride present therein, a pinkish magenta color.

The radiation sensitive materials or scotophors are prepared by dry grinding a mixture of the alkaline earth fluoride with between about 0.1 and 5 mol percent, preferably about 1 mol percent, of the alkali metal fluoride and firing the powder mixture in silica crucibles or trays at a high temperature to effect diffusion of the alkali metal fluoride into the crystal lattice of the alkaline earth fluoride. Firing is done for about ½ to 1 hour and at temperatures which are about 150 degrees below the melting point of the alkaline earth fluoride, for example, at 1200° C. for calcium fluoride, at 1100° C. for barium fluoride and at 1050° C. for strontium fluoride. To avoid hydrolysis of the alkaline earth fluoride, the firing is conducted in a vacuum or in a dry inert atmosphere, for example, in dry nitrogen or helium. After firing of the salt mixture is completed, the mass is broken up, ground to a powder and any excess of the alkali metal fluoride leached out with dilute hydrochloric acid (e. g. 10% HCl). The presence of trivalent metal ions in the radiation sensitive materials reduces their capacity to develop color on irradiation and, accordingly, the starting salts should be free from these ions.

The radiation dosimeters of the invention may take various forms in which the fine particles of the radiation sensitive material are supported by means which allows visual determination of the depth of the color developed in the sensitive material on exposure to the radiation. Alternatively and preferably, the dosimeter is a single large crystal of the radiation sensitive material.

A dosimeter for determining the intensity of the softer of the hard radiations, such as low voltage X-rays, is shown in Figure 1. A thin layer of the powdered radiation sensitive material 1 is affixed by means of a suitable adhesive, such as bone glue and synthetic resin adhesives, to a firm support 2, rigid or semi-rigid, such as a sheet of cardboard, metal, glass or plastic. A direct reading of the depth of the color developed in the radiation sensitive material in terms of unit dosage of radiation can be had by the use of a color chart 3 graded in depth of shade to correspond to units of, for example, 100, 200, 300, etc., roentgens. The color chart is disposed adjacent the radiation sensitive material as shown in the drawing and can be printed on the surface of the supporting sheet or affixed thereto in the form of a printed strip of paper or of similar flexible material.

For measurement of the intensity of the harder radiations such as high voltage X-rays and gamma rays, a longer optical path is needed than is provided by the dosimeter of Figure 1. For this purpose either a single crystal of the radiation sensitive material of large dimensions, for example, one which measures 1" x 1" x 1" may be used, or the powdered radiation sensitive material is dispersed in a transparent solid or liquid of matching refractive index to simulate in transparency a single crystal of large dimensions. The transparent solid may be glass or a plastic of the proper refractive index. For calcium fluoride, for example, which has a refractive index of 1.434, one may use as a plastic transparent solid suspending medium, polyvinyl acetate or polyvinyl acetal, and as a transparent liquid suspending medium, ethylene glycol to which glycerol has been added in proportions to give a solution of the proper refractive index.

The fine radiation sensitive material may be used in concentrations of from about 1 to 80% by weight in the transparent suspending medium. As will be understood by those skilled in the art, the concentration of the radiation sensitive material in the dosimeter will vary in accordance with the level of the intensity of the hard radiation to be measured, the higher the intensity of the radiation, the lower generally will be the concentration of the radiation sensitive material required. For example, with high intensity radiation of the order of a million or so roentgens about 1 to 10% by weight of the radiation sensitive material will suffice for the development of the color in the dosimeter, whereas with low intensity radiation, higher concentrations of the radiation sensitive material will be required, on the order of 70 to 80% by weight. As will be also understood, the length of the dosimeter as it relates to viewing of it by transmitted light will depend upon the solids content therein, the higher this is the shorter is the permissible maximum length consistent with obtaining clarity for viewing the dosimeter by transmitted light. Dosimeters of a high degree of clarity containing 1 to 10% solids by weight can be made up in lengths of about a half inch, an inch or two inches, or in any practical longer length. For visiually read dosimeters used for measuring low intensity radiation and containing 70 to 80% solids, the length of the dosimeter should generally not exceed about an inch.

The powdered radiation sensitive material may be dispersed in the solid or liquid transparent medium in any way found suitable. The dispersion can be effected by simply mixing the powdered radiation sensitive material in thorough fashion with the liquid transparent medium and with the solid transparent medium previously made thinly fluid by melting with heat. The dispersion from the latter operation is solidified in molds of the desired configuration which provide a pair of opposed flat-surfaced end walls on the resulting dosimeter. The purpose of the opposed flat end walls is to facilitate reading of the dosimeter by transmitted light. The liquid type of dosimeter is also constructed to have a pair of opposed flat end walls for this purpose.

A dosimeter having a solid type radiation sensitive element for the detection and measurement of hard radiation is shown in Figure 2. The radiation sensitive element 4 is a suspension of fine particles of the radiation sensitive alkaline earth fluoride in a transparent block of plastic of matching refractive index. The block is provided with a pair of opposed flat surfaces to facilitate reading of the same by transmitted light. Surrounding the sensitive element 4 in tightly fitting relationship is a translucent color chart 5 formed of adhesively joined or fused longitudinal segments each uniformly dyed in a graded depth of the color developed in the sensitized alkaline earth fluoride after irradiation. The color depths may be graded to correspond to unit radiation dosages of, for example, 50, 100, 150, 200, 250, 300, etc., roentgens. The translucent material of the chart 5 is the same as that of the radiation sensitive element 4 but in place of the radiation sensitive material it contains a like proportion of the fine, untreated, non-sensitized alkaline earth fluoride dispersed therein. A snugly fitting two part casing 6 of radiation transparent plastic or of other similar durable material is provided for protecting the sensitive element and its associated color chart against chipping and breakage in handling and use. The dosimeter is read by removing the sensitive element 4 and its associated color chart 5 from the casing 6 and viewing the sensitive element 4 by transmitted light through its opposed flat surfaces. By comparing the observed depth of color with the color values of the chart 5, the unit intensity of the hard radiation can be directly determined.

A dosimeter in which the radiation sensitive element is of the liquid type is shown in Figure 3. A tube having a flat bottom and formed of a transparent material, such as a clear glass or plastic, is filled with the liquid radiation sensitive material 8 which is a suspension of fine particles of the radiation sensitive alkaline earth fluoride in a liquid of matching refractive index. The tube 7 is provided at its upper end with a closure 9 for sealing it against outflow of the liquid. This closure is conveniently a clear plastic cap which is fitted tightly down over the end of the tube and shaped to give a transparent flat surface 10 thereacross for the purpose of facilitating viewing of the dosimeter by transmitted light. A two part closely fitting case 11 of radiation transparent plastic or of other similar durable material is provided to protect the dosimeter against damage in handling and use. The unit dosage of the absorbed hard radiation can be determined by viewing the exposed dosimeter through the transparent flat end surface 10 in transmitted light and comparing the observed depth of color with those of a series of colorometric standards graded by depth of color in units of radiation dosage, for example, 50, 100, 150, 200, etc., roentgens. The color standards are made up of the same transparent liquid as is used in the dosimeter but in place of the radiation sensitive material, a like proportion of the fine, untreated, non-sensitive alkaline earth fluoride is dispersed in the liquid. The gradations in color can be obtained by dyeing portions of the liquid suspension to graded depths of the color developed in the dosimeter by the hard radiation.

A dosimeter in the form of a single large transparent crystal is shown in Figure 4. The transparent crystal 12 can be grown from a melt of the radiation sensitive material by the known Bridgman or Stockbarger technique. A color chart 13 formed of a transparent plastic having a refractive index close to or matching that of the crystal 12 fits closely about the latter. The color chart otherwise is similar to that shown in Figure 2. The two part protective casing 14 is similar in arrangement and construction to the casing shown in Figure 2, the crystal 12 and the color chart 13 being removed as a unit from the casing 14 for colorometric determination of unit dosage of absorbed radiation.

It is to be understood that while we have described our invention with particular reference to dosimetry as practiced by visual observation, evaluation of the depth of the color developed in the exposed radiation sensitive material and translation of the reading into units of radiation dosage can also be practiced by the application of photometers or other fine optical metering devices.

While in the foregoing we have described certain specific embodiments of the invention, it is to be understood that these are intended primarily by way of illustration and the scope of the invention is to be limited only by the prior art and the appended claims.

The invention described herein may be manufactured and used by or for the Government of the United States of America for governmental purposes without the payment of any royalties thereon or therefor.

What is claimed is:

1. A radiation sensitive material capable of developing color therein on exposure to X-rays and gamma rays comprising an alkaline earth fluoride having an alkali metal fluoride diffused in the crystal lattice thereof.

2. A radiation sensitive material capable of developing color therein on exposure to X-rays and gamma rays comprising calcium fluoride having an alkali metal fluoride diffused in the crystal lattice thereof.

3. A radiation sensitive material capable of developing color therein on exposure to X-rays and gamma rays comprising calcium fluoride having sodium fluoride diffused in the crystal lattice thereof.

4. A radiation sensitive material capable of developing color therein on exposure to X-rays and gamma rays comprising barium fluoride having an alkali metal fluoride diffused in the crystal lattice thereof.

5. A transparent crystal of an alkaline earth fluoride capable of developing color therein on exposure to X-rays and gamma rays having an alkali metal fluoride diffused in the crystal lattice.

6. A transparent crystal of calcium fluoride capable of developing color therein on exposure to X-rays and gamma rays having an alkali metal fluoride diffused in the crystal lattice.

7. A transparent crystal of calcium fluoride capable of developing color therein on exposure to X-rays and gamma rays having sodium fluoride diffused in the crystal lattice.

8. A radiation dosimeter comprising fine particles of a radiation sensitive material capable of developing color therein on exposure to X-rays and gamma rays supported by means allowing visual observation of the developed color, said radiation sensitive material comprising an alkaline earth fluoride having an alkali metal fluoride diffused in the crystal lattice thereof.

9. A radiation dosimeter comprising fine particles of a radiation sensitive material capable of developing color therein on exposure to X-rays and gamma rays supported by means allowing visual observation of the developed color, said radiation sensitive material comprising calcium fluoride having sodium fluoride diffused in the crystal lattice thereof.

10. A radiation dosimeter comprising a sheet of firm material having affixed to a broad face thereof a thin layer of fine particles of a radiation sensitive material capable of developing color therein on exposure to X-rays and gamma rays, said radiation sensitive material comprising an alkaline earth fluoride having an alkali metal fluoride diffused in the crystal lattice thereof.

11. A radiation dosimeter comprising fine particles of a radiation sensitive material capable of developing color therein on exposure to X-rays and gamma rays dispersed in a transparent solid of matching refractive index having a pair of opposed flat surfaces, said radiation sensitive material comprising an alkaline earth fluoride having an alkali metal fluoride diffused in the crystal lattice thereof.

12. A radiation dosimeter comprising fine particles of a radiation sensitive material capable of developing color therein on exposure to X-rays and gamma rays suspended in a transparent liquid of matching refractive index which fills and is sealed within a flat-bottomed tube of transparent material provided at its top end with a flat transparent window through which visual determination of the depth of the developed color can be made, said radiation sensitive material comprising an alkaline earth fluoride having an alkali metal fluoride diffused in the crystal lattice thereof.

References Cited in the file of this patent

UNITED STATES PATENTS

| | | |
|---|---|---|
| 2,258,593 | Black | Oct. 14, 1941 |
| 2,624,011 | Stern | Dec. 30, 1952 |

FOREIGN PATENTS

| | | |
|---|---|---|
| 17,666 | Great Britain | Sept. 24, 1903 |